United States Patent [19]

Ishii et al.

[11] Patent Number: 4,507,417
[45] Date of Patent: Mar. 26, 1985

[54] STABILIZERS FOR SYNTHETIC RESINS

[75] Inventors: Tamaki Ishii, Suita; Shinichi Yachigo; Yukoh Takahashi, both of Toyonaka, all of Japan

[73] Assignee: Sumitomo Chemical Company, Limited, Osaka, Japan

[21] Appl. No.: 542,518

[22] Filed: Oct. 17, 1983

[30] Foreign Application Priority Data

Oct. 16, 1982 [JP] Japan ................... 57-182006

[51] Int. Cl.³ .............................. C08K 5/34
[52] U.S. Cl. .................... 524/101; 524/108; 524/109; 524/110; 524/419
[58] Field of Search ............ 524/101, 108, 109, 110, 524/419

[56] References Cited

U.S. PATENT DOCUMENTS

| | | | |
|---|---|---|---|
| 3,531,483 | 9/1970 | Gilles | 524/101 |
| 3,629,194 | 12/1971 | Onisha | 524/163 |
| 3,678,047 | 7/1972 | Kletecka et al. | 524/101 |
| 3,707,542 | 12/1972 | Steinberg et al. | 524/101 |
| 3,758,549 | 10/1973 | Dexter et al. | 524/163 |
| 3,909,491 | 9/1975 | Gilles | 524/101 |
| 3,966,675 | 6/1976 | Schurdak et al. | 524/101 |
| 4,385,143 | 5/1983 | Yachigo et al. | 524/101 |

FOREIGN PATENT DOCUMENTS

| | | | |
|---|---|---|---|
| 76067 | 4/1983 | European Pat. Off. | 524/101 |
| 7003854 | 6/1980 | Japan | 524/101 |
| 185330 | 11/1982 | Japan | 524/101 |

Primary Examiner—John Kight
Assistant Examiner—Kriellion Morgan
Attorney, Agent, or Firm—Wenderoth, Lind & Ponack

[57] ABSTRACT

A novel stabilizing mixture composed of 1 1,3,5-tris 2-[3-(3-t-butyl-4-hydroxy-5-methyl-phenyl)-propionyloxyl] ethyl isocyanuric acid (I) and at least one sulfur-containing compound (II) selected from compounds represented by the general formulas (II-1) and (II-2):

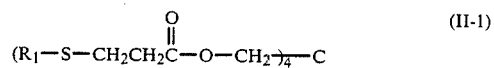

wherein $R_1$ is an alkyl group having 4 to 20 carbon atoms, and

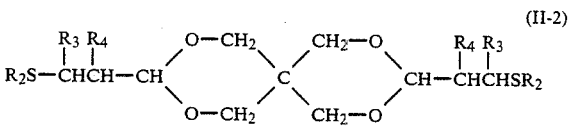

wherein $R_2$ is an alkyl group having 3 to 18 carbon atoms, and $R_3$ and $R_4$ each independently is a hydrogen atom or an alkyl group having 1 to 6 carbon atoms, is useful as a stabilizer for synthetic resins.

5 Claims, No Drawings

STABILIZERS FOR SYNTHETIC RESINS

The present invention relates to stabilizers for synthetic resins which provide excellent stability to synthetic resins.

Various synthetic resins including polyolefins such as polyethylene, polypropylene, etc., styrene synthetic resins such as polystyrene, impact resistant polystyrene, ABS, etc., engineering plastics such as polyacetal, polyamide, etc., and polyurethane, are widely used in various fields. However, it is well known that when these synthetic resins are used singly, they are not stable enough, that is to say, they deteriorate upon processing or upon use, by the action of heat, light and oxygen, to impair their mechanical properties remarkably, becoming soft, brittle, discolored, and forming cracks on the surface.

To solve this problem, it is also well known to use various phenolic, phosphite-type or sulfur-containing antioxidants. For example, it is known to use singly a phenolic type antioxidant such as 2,6-di-t-butyl-4-methylphenol; 2,2'-methylenebis(4-methyl-6-t-butylphenol); 4,4'-butylidenebis(3-methyl-6-t-butylphenol); n-octadecyl 3-(3,5-di-t-butyl-4-hydroxyphenyl)propionate; 1,1,3-tris(2-methyl-4-hydroxy-5-t-butylphenyl)butane; tetrakis[3-(3,5-di-t-butyl-4-hydroxyphenyl)propionyloxymethyl]methane; etc., or to use such phenolic antioxidant together with a phosphite-type antioxidant such as tris(nonylphenyl)phosphite; distearylpentaerythriol diphosphite; etc., or to use the above-mentioned phenolic antioxidant in combination with a sulfur-containing antioxidant such as dilauryl thiodipropionate; dimyristyl thiodipropionate; distearyl thiodipropionate; etc.

However, these methods are also not yet satisfactory enough in respect of stability to heat and oxidation, discoloration by heat, and vaporization.

In order to solve these problems, we made an intensive study. As a result, we have found that, by mixing synthetic resins with a particular phenolic compound and a particular sulfur-containing compound, it is possible to obtain a surprising synergetic effect which can never be anticipated from conventional techniques of combining antioxidants together, and this mixture provides excellent stability to heat and oxidation to the synthetic resins. The present invention has been accomplished on the basis of this discovery.

The present invention provides a stabilizer for synthetic resins, of which the effective component is a mixture composed of a 1,3,5-tris{2-[3-(3-t-butyl-4-hydroxy-5-methylphenyl)propionyloxy]ethyl}isocyanuric acid [phenolic compound(I)] represented by the formula (I):

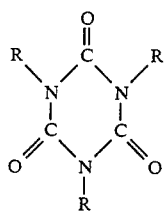 (I)

-continued

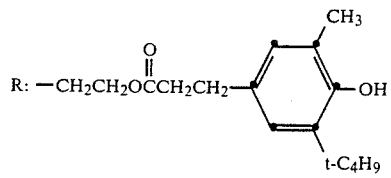

and at least one sulfur-containing compound (II) selected from compounds represented by the general formulas (II-1) and (II-2):

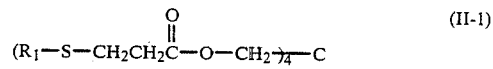 (II-1)

wherein $R_1$ is an alkyl group having 4 to 20 carbon atoms, and

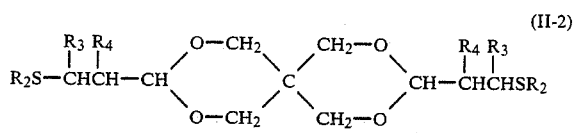 (II-2)

wherein $R_2$ is an alkyl group having 3 to 18 carbon atoms and $R_3$ and $R_4$ each independently is a hydrogen atom or an alkyl group having 1 to 6 carbon atoms, in the ratio (I):(II) of 1:05-15 by weight.

The present 1,3,5-tris{2-[3-(3-t-butyl-4-hydroxy-5-methylphenyl)propionyloxy]ethyl}isocyanuric acid may be prepared by the esterification of 3-(3-t-butyl-4-hydroxy-5-methylphenyl)propionic acid with a 1,3,5-tris(2-hydroxyethyl)isocyanuric acid.

In the compounds represented by the general formula (II-1), i.e. tetrakis(3-alkyl thiopropionyloxymethyl)methanes, the substituent $R_1$ represents an alkyl group having 4–20 carbon atoms, but preferably an alkyl group having 6 to 18 carbon atoms in respect of stability to heat and oxidation, and most preferred is dodecyl group with 12 carbon atoms.

Representative examples of such compounds are shown in Table 1.

TABLE 1

$(R_1-S-CH_2CH_2\overset{O}{\overset{\|}{C}}-O-CH_2)_4 C$

| Compound No. | $R_1$ |
|---|---|
| II-1-1 | $-C_6H_{13}$ |
| II-1-2 | $-C_{12}H_{25}$ |
| II-1-3 | $-C_{18}H_{37}$ |

In the sulfur-containing compounds represented by the general formula (II-2), $R_2$ represents an alkyl group having 3–18 carbon atoms, but it is preferable that the substituent $R_2$ is an alkyl group having 12 to 18 carbon atoms in respect of stability to heat and oxidation, and each of $R_3$ and $R_4$ is hydrogen atom or an alkyl group having 1 to 6 carbon atoms, but preferably an alykl group with 1 to 3 carbon atoms in respect of stability to heat and oxidation.

Representative examples of such compounds are shown in Table 2.

TABLE 2

| Compound No. | R$_2$ | R$_3$ | R$_4$ |
|---|---|---|---|
| II-2-1 | —C$_8$H$_{17}$ | —CH$_3$ | —H |
| II-2-2 | —C$_{12}$H$_{25}$ | —C$_4$H$_9$ | —H |
| II-2-3 | —C$_{12}$H$_{25}$ | —CH$_3$ | —H |
| II-2-4 | —C$_{18}$H$_{37}$ | —CH$_3$ | —H |
| II-2-5 | —C$_{12}$H$_{25}$ | —H | —H |
| II-2-6 | —C$_{18}$H$_{37}$ | —H | —CH$_3$ |

These sulfur-containing compounds (II-2) may be prepared by the acetalization of pentaetythrithol with an aldehyde represented by the general formula:

$$R_2-S-\overset{R_3}{\underset{|}{C}}H\overset{R_4}{\underset{|}{C}}H-CHO$$

wherein R$_2$, R$_3$ and R$_4$ are as defined above.

The stabilizer for synthetic resins of the present invention is composed of a mixture of a phenolic compount (I) represented by the formula (I) and at least one sulfur-containing compound (II) selected from the compounds represented by the general formulas (II-1) and (II-2), and the mixing ratio (I):(II) by weight is 1:0.5–15, preferably 1:1–10, and more preferably 1:2–6.

When the sulfur-containing compound (II) is less than 0.5 times by weight for the phenolic compound (I), the desired effect cannot be fully attained. Also, even when it exceeds 15 times by weight, the effect obtained does not become correspondingly large, which is unfavorable economically.

The total amount of the stabilizer to be added to a synthetic resin is usually 0.01–5 weight parts and preferably 0.05–1 weight part for 100 weight parts of the synthetic resin.

In use, the phenolic compound (I) and the sulfur-containing compound (II) may be mixed separately with the synthetic resin, without previously preparing a mixture of the compounds. For this, any proper apparatus and method known for the addition of stabilizer, pigment, filler, etc. to a synthetic resin may be used.

In addition to the stabilizer for synthetic resins of the present invention, other additives, for example, ultraviolet absorber, light stabilizer, antioxidant, metal deactivator, metallic soap, nucleating agent, lubricant, antistatic agent, flame retardant, pigment, filler, etc. may be used in combination therewith.

The resistance to light of the sythetic resin can be improved by using the stabilizer of the present invention together with ultraviolet absorber, hindered amine type light-stabilizer, etc. for example, 2-hydroxy-4-methoxybenzophenone, 2-hydroxy-4-n-octoxybenzophenone, 2(2-hydroxy-5-methylphenyl)benzotriazole, 2(2-hydroxy-3-t-butyl-5-methylphenyl)-5-chlorobenzotriazole, 2(2-hydroxy-3,5-di-t-butylphenyl)-5-chlorobenzotriazole, 2(2-hydroxy-3,5-di-amylphenyl)benzotriazole, [2,2'-thiobis(4-t-octylphenolate)]-butylamine nickel salt, 2,2,6,6-tetramethyl-4-piperidinyl benzoate, bis(2,2,6,6-tetramethyl-4-piperidinyl)sebacate, bis(1,2,2,6,6-pentamethyl-4-piperidyl) 2-(3,5-di-t-butyl-4-hydroxybenzyl)-2-n-butyl-malonate, 1-[2-{3-(3,5-di-t-butyl-4-hydroxyphenyl)propionyloxy}ethyl]-4-[3-(3,5-di-t-butyl-4-hydroxyphenyl)propionyloxy]-2,2,6,6-tetramethylpiperidine, and dimethyl succinate/1-(2-hydroxyethyl)-4-hydroxy-2,2,6,6-tetramethylpiperidine condensation product.

By using the stabilizer of the present invention together with other phosphite-type antioxidant, the color of the synthetic resin can be improved. Such phosphite-type antioxidants include, for example, distearylpentaetythritol diphosphite, tris(2,4-di-t-butylphenyl)phosphite, tris(2-t-butyl-4-methylphenyl)phosphite, bis(2,4-di-t-butylphenyl)pentaerythritol diphosphite, tetrakis(2,4-di-t-butylphenyl)-4,4'-biphenylene diphosphite, etc.

By using the stabilizer for synthetic resins of the present invention, the stability of synthetic resins is greatly improved. Example of such synthetic resins include low density polyethylene, high density polyethylene, linear low density polyethylene, chlorinated polyethylene, EVA resin, polypropylene, polyvinyl chloride, methacrylic resin, polystyrene, impact resistant polystyrene, ABS resin, AES resin, MBS resin, polyethylene terephthalate, polybutylene terephthalate, polyamide, polyimide, polycarbonate, polyacetal, polyurethane, unsaturated polyester resin, etc. Among them, the stabilizer is effective particularly for polypropylene.

The invention will be explained further by referring to the following Examples which are given for illustration purpose only and not for limitation of the scope of the invention in any way.

PREPARATION EXAMPLE

Production of 1,3,5-tris{2-[3-(3-t-butyl-4-hydroxy-5-methylphenyl)-propionyloxy]ethyl}isocyanuric acid i.e. phenolic compound (I)

In a 500 ml 4-necked flask fitted with a thermometer, stirrer and Dean-Stalk trap, there were charged 7.84 g (0.03 mol) of 1,3,5-tris(hydroxyethyl)isocyanuric acid, 23.39 g (0.099 mol) of 3-(3-t-butyl-4-hydroxy-5-methylphenyl)propionic acid and 200 ml of toluene. After purging with nitrogen gas, there was added 1.14 g (0.006 mol) of p-toluenesulfonic acid. While stirring the mixture was heated and the reaction was conducted at 112° C. for 5 hours, during which water developed upon azeotropic distillation was trapped with the Dean-Stalk trap in order to prevent the same from flowing back to the reaction system.

After the reaction the mixture was cooled to the room temperature and the toluene layer was washed three times with 150 ml of 5% aqueous solution of sodium carbonate and further washed three times with 150 ml water. Upon distillation of toluene, there was obtained 27.0 g (Yield 98.2%) of 1,3,5-tris{2-[3-(3-t-butyl-4-hydroxy-5-methylphenyl)propionyloxy]ethyl}isocyanuric acid in the form of light brown glass-like solid.

Elemental analysis as $C_{51}H_{69}N_3O_{12}$: Calculated: C: 66.86%, H: 7.59%, N: 4.59%; Found: C: 66.76%, H: 7.70%, N: 4.62%.

Mass analysis (FD-mass): $(M+1)^+$ peak 916.

$^1$H-NMR (CD Cl$_3$, TMS, 60 MHz): δ1.37: (27H s), δ2.16: (9H s), δ2.69: (12H m), δ4.25: (12H br.s), δ4.83: (3H br.s), δ6.82: (3H br.s), δ6.94: (3H br.s).

EXAMPLE 1

The following components were mixed for 5 minutes with a mixer, and melt-kneaded with a mixing roll at 180° C. The compound thus obtained was formed by a heated press of 210° C. into a sheet of 1 mm thickness.

A test piece of the dimensions of 40×40×1 mm was produced. The time until 30% of the area of the test piece becomes brittle in a gear oven of 160° C. was measured. This time period was determined as the induction period to embrittlement, by which the stability to heat and oxidation was evaluated. The results are shown in Table 3.

Components:

| | |
|---|---|
| Non-stabilized polypropylene resin | 100 weight parts |
| Calcium stearate | 0.1 weight part |
| Test compound | variable |

In Table 3, the signs of the test compounds show the following compounds:

AO-1: n-octadecyl 3-(3,5-di-tert-butyl-4-hydroxyphenyl)propionate,
AO-2: tetrakis[3-(3,5-di-t-butyl-4-hydroxyphenyl)propionyloxymethyl]methane,
AO-3: 1,3,5-tris{2-[3-(3,5-di-t-butyl-4-hydroxyphenyl)propionyloxy]ethyl}isocyanuric acid,
AO-4: 1,1,3-tris(2-methyl-4-hydroxy-5-t-butylphenyl)butane,
AO-5: dilauryl thiodipropionate,
AO-6: distearyl thiodipropionate.

TABLE 3

| Test compound | Example of the Invention | | | | | | | | | | | | | Example for Comparison | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Phenolic | | | | | | | | | | | | | | | | | | |
| I | 0.05 | 0.05 | 0.05 | 0.05 | 0.05 | 0.05 | 0.05 | 0.05 | 0.05 | 0.05 | 0.05 | 0.05 | 0.05 | | | | | |
| AO-1 | | | | | | | | | | | | | | 0.05 | | | | |
| AO-2 | | | | | | | | | | | | | | | 0.05 | | | |
| AO-3 | | | | | | | | | | | | | | | | 0.05 | | |
| AO-4 | | | | | | | | | | | | | | | | | 0.05 | 0.05 |
| Sulfur-containing | | | | | | | | | | | | | | | | | | |
| II-1-1 | 0.2 | | | | | | | | | | | | | | | | | |
| II-1-2 | | 0.1 | 0.2 | 0.3 | | | | | | | | | | | | | | |
| II-1-3 | | | | | 0.2 | | | | | | | | | | | | | |
| II-2-1 | | | | | | 0.2 | | | | | | | | | | | | |
| II-2-2 | | | | | | | 0.2 | | | | | | | | | | | |
| II-2-3 | | | | | | | | 0.2 | | | | | | | | | | |
| II-2-4 | | | | | | | | | 0.1 | 0.2 | 0.3 | | | | | | | |
| II-2-5 | | | | | | | | | | | | 0.2 | | | | | | |
| II-2-6 | | | | | | | | | | | | | 0.2 | | | | | |
| AO-5 | | | | | | | | | | | | | | | | | | |
| AO-6 | | | | | | | | | | | | | | | | | | |
| Induction period to embrittlement (hours) | 1100 | 995 | 1480 | 1800 | 1230 | 1120 | 1240 | 1300 | 980 | 1420 | 1720 | 1300 | 1390 | 140 | 30 | 50 | 45 | 25 |

| Test compound | Example for Comparison | | | | | | | | | | | | | | | | | | | |
|---|---|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 | 37 | 38 |
| Phenolic | | | | | | | | | | | | | | | | | | | | |
| I | | | | | | | | | | | | | | | | | | | | |
| AO-1 | | | | | | | | | | | | 0.05 | 0.05 | | | | | | | |
| AO-2 | | | | | | | | | | | | | | 0.05 | 0.05 | 0.05 | | | | |
| AO-3 | | | | | | | | | | | | | | | | | 0.05 | 0.05 | 0.05 | 0.05 |
| AO-4 | | | | | | | | | | | | | | | | | | | | |
| Sulfur-containing | | | | | | | | | | | | | | | | | | | | |
| II-1-1 | 0.2 | | | | | | | | | | | | | | | | | | | |
| II-1-2 | | 0.2 | | | | | | | | | | | | 0.2 | | | 0.2 | 0.3 | | |
| II-1-3 | | | 0.2 | | | | | | | | | | | | | | | | | |
| II-2-1 | | | | 0.2 | | | | | | | | | | | | | | | | |
| II-2-2 | | | | | 0.2 | | | | | | | | | | | | | | 0.2 | |
| II-2-3 | | | | | | 0.2 | | | | | | | | | | | | | | |
| II-2-4 | | | | | | | 0.2 | | | | | | | | 0.2 | | | | | 0.2 |
| II-2-5 | | | | | | | | 0.2 | | | | | | | | | | | | |
| II-2-6 | | | | | | | | | 0.2 | | | | | | | | | | | |
| AO-5 | | | | | | | | | | 0.2 | | 0.2 | | | | | | | | |
| AO-6 | | | | | | | | | | | 0.2 | | 0.2 | | | 0.2 | | | | |
| Induction period to embrittlement (hours) | 30 | 30 | 20 | 20 | 20 | 20 | 20 | 20 | 20 | 15 | 15 | 440 | 560 | 310 | 320 | 330 | 400 | 480 | 390 | 440 |

| Test compound | Example for Comparison | | | | | | | | | | | | | | | |
|---|---|---|---|---|---|---|---|---|---|---|---|---|---|---|---|---|
| | 39 | 40 | 41 | 42 | 43 | 44 | 45 | 46 | 47 | 48 | 49 | 50 | 51 | 52 | 53 | 54 |
| Phenolic | | | | | | | | | | | | | | | | |
| I | | | | | | | | | | | | | | | | NON-ADDITION |
| AO-1 | | | | | | | | | | | | | | | | |
| AO-2 | 0.05 | 0.05 | 0.05 | 0.05 | 0.05 | | | | | | | | | | | |
| AO-3 | | | | | | 0.05 | 0.05 | 0.05 | 0.05 | 0.05 | 0.05 | 0.05 | | | | |
| AO-4 | | | | | | | | | | | | | 0.05 | 0.05 | 0.05 | |
| Sulfur-containing | | | | | | | | | | | | | | | | |
| II-1-1 | | | | | | | | | | | | | | | | |

TABLE 3-continued

| | | | | | | | | | | | | | | | | |
|---|---|---|---|---|---|---|---|---|---|---|---|---|---|---|---|---|
| II-1-2 | | | | 0.2 | 0.3 | | | | | | | 0.2 | | | | |
| II-1-3 | | | | | | | | | | | | | | | | |
| II-2-1 | | | | | | | | | | | | | | | | |
| II-2-2 | | | | | | | | | | | | | | | | |
| II-2-3 | | | | | | | | | | | | | | | | |
| II-2-4 | 0.3 | | | | | | 0.2 | 0.3 | | | | | 0.2 | | | |
| II-2-5 | | | | | | | | | | | | | | | | |
| II-2-6 | | | | | | | | | | | | | | | | |
| AO-5 | | 0.2 | 0.3 | | | | | | 0.2 | | | | | | | |
| AO-6 | | | | 0.2 | 0.3 | | | | | 0.2 | 0.3 | | | 0.2 | | |
| Induction period to embrittlement (hours) | 530 | 450 | 500 | 750 | 820 | 380 | 440 | 420 | 500 | 400 | 410 | 470 | 510 | 430 | 390 | 5 |

EXAMPLE 2

To a graft ABS latex, suspensions, produced by bead-peptization with an anionic surface-active agent, of the test compounds shown in Table 4 were added in amounts shown in Table 4. In the usual way, the mixture was salted out with an aqueous magnesium sulfate solution, and the resulting precipitate was filtered, washed with water and dried. The stability to heat and oxidation was evaluated by the following methods, using the ABS resin powder thus obtained as the test material. The results are shown in Table 4.

1. After heat-ageing in a gear oven at 180° C., the degree of discoloration of the ABS resin was observed, 2. The oxygen absorption induction period (I.P.) was measured in an oxygen atmosphere at 170° C., using an oxygen absorption induction period measuring apparatus, 3. The ABS resin powder was extruded repeatedly using a small extruder (screw D=20 mm $\phi$, L/D=25, strand die D=3 mm $\phi$, L/D=10) under the following condition. The degree of the discoloration of the ABS pellets of the forth extrusion was evaluated by the color difference $\Delta$YI from the non-addition ABS pellets of the first extrusion.

Extrusion condition:

| Temperature: | $C_1$ | $C_2$ | $C_3$ | D |
|---|---|---|---|---|
| | 220° | 240° | 260° | 280° C. |

4. The ABS pellets after the forth extrusion obtained in the above-mentioned method of paragraph 3 was compression-molded at 180° C. for 10 minutes to prepare a No. 1 Test Piece specified in JIS K 7111. By using a Charpy impact testing machine, the Charpy impact value of the Test Piece was measured, following JIS K 7111.

In Table 4, AO-7 is the following compound.
AO-7: 2,6-di-t-butyl-4-methylphenol.

TABLE 4

| Test compound | Example of the Invention | | | | | | Example for Comparison | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Phenolic | | | | | | | | | | | | | |
| I | 0.5 | 0.5 | 0.5 | 0.5 | 0.5 | 0.5 | 0.5 | 1.0 | 0.5 | 0.5 | | | |
| AO-3 | | | | | | | | | | | 0.5 | 1.0 | 0.5 |
| AO-7 | | | | | | | | | | | | | |
| Sulfur-containing | | | | | | | | | | | | | |
| II-1-2 | 0.5 | 1.0 | | | | | | | | | | | 0.5 |
| II-2-4 | | | 0.5 | 1.0 | | | | | | | | | |
| II-2-5 | | | | | 0.5 | 1.0 | | | | | | | |
| AO-5 | | | | | | | | | 0.5 | 1.0 | | | |
| Discoloration | | | | | | | | | | | | | |
| after 30 min. | light yellow | light yellow | light yellow | light yellow | light yellow | light yellow | deep brown | yellow brown | yellow brown | yellow brown | deep brown | yellow brown | yellow brown |
| after 60 min. | yellow brown | yellow brown | yellow brown | yellow brown | yellow brown | yellow brown | black brown | deep brown | brown | brown | black brown | deep brown | brown |
| Oxygen absorption induction period (min.) | 200 | 265 | 195 | 250 | 200 | 255 | 135 | 155 | 140 | 155 | 135 | 155 | 145 |
| $\Delta$YI | 11.0 | 11.3 | 11.2 | 11.6 | 11.1 | 11.5 | 14.9 | 14.7 | 14.9 | 15.4 | 15.5 | 14.1 | 15.2 |
| Charpy impact value (Kg f · cm/cm) | 21.0 | 21.6 | 20.0 | 20.7 | 20.5 | 21.1 | 11.3 | 13.0 | 11.7 | 13.5 | 11.0 | 13.1 | 12.5 |

| Test compound | Example for Comparison | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| Phenolic | | | | | | | | | | | | |
| I | | | | | | | | | | | | NON-ADDITION |
| AO-3 | 0.5 | 0.5 | 0.5 | 0.5 | 0.5 | 0.5 | | | | | | |
| AO-7 | | | | | | | 1.0 | 0.5 | 0.5 | 0.5 | 0.5 | |
| Sulfur-containing | | | | | | | | | | | | |
| II-1-2 | 1.0 | | | | | | | | 0.5 | | | |
| II-2-4 | | 0.5 | | | | | | | | 0.5 | | |

TABLE 4-continued

| | | | | | | | | | | | | |
|---|---|---|---|---|---|---|---|---|---|---|---|---|
| II-2-5 | | | 0.5 | 1.0 | | | | | | 0.5 | | |
| AO-5 | | | | | 0.5 | 1.0 | | | | | 0.5 | |
| Discoloration | | | | | | | | | | | | |
| after 30 min. | yellow brown | yellow brown | yellow brown | yellow brown | yellow brown | yellow brown | yellow brown | deep brown | deep brown | deep brown | deep brown | deep brown |
| after 60 min. | brown | brown | brown | brown | brown | brown | brown | black brown | black brown | black brown | black brown | black brown |
| Oxygen absorption induction period (min.) | 150 | 145 | 145 | 150 | 145 | 150 | 145 | 150 | 150 | 150 | 140 | 10 |
| ΔYI | 15.5 | 14.5 | 14.8 | 15.2 | 14.9 | 15.7 | 13.2 | 14.5 | 14.6 | 14.8 | 15.0 | 15.9 |
| Charpy impact value (Kg f · cm/cm) | 13.2 | 12.5 | 12.3 | 12.6 | 11.8 | 13.0 | 12.8 | 12.4 | 12.5 | 12.4 | 11.7 | 7.2 |

Note
In the Table 4, the amount of test compound added is weight of solid matter for 100 weight parts of the solid matter of resin.

EXAMPLE 3

To a 25% urethane dope (prepared from 25 parts of urethane resin, 3.75 parts of dimethylformamide and 71.25 parts of tetrahydrofuran), each of the test compounds shown in Table 5 was added in an amount by weight parts shown in Table 5 for 100 weight parts of the above-mentioned polyurethane. Thereafter, the resulting dope was coated in 1.2 mm thickness on a polyester film, and was dried at 45° C. for one hour in a drier. The sheet thus obtained was punched out into test pieces by a No. 3 Dumbbell.

After irradiated with light for 60 hours and 120 hours in a Fade-O-Meter (light source: UV carbon arc; black panel temperature: 63°±3° C.), the test pieces were subjected to a tensile test (tensile speed: 200 mm/min; measurement temperature: 25° C.) to obtain the retension ratio of break strength. The results are shown in Table 5.

TABLE 5

| Test compound | Example of the Invention | | | | | | Example for comparison | | | | | |
|---|---|---|---|---|---|---|---|---|---|---|---|---|
| | 1 | 2 | 3 | 4 | 5 | 6 | 7 | 8 | 9 | 10 | 11 | 12 |
| Phenolic | | | | | | | | | | | | |
| I | 0.5 | 0.5 | 0.5 | 0.5 | 0.5 | 0.5 | 0.5 | 1.0 | 0.5 | 0.5 | | |
| AO-1 | | | | | | | | | | | 0.5 | 0.5 |
| AO-3 | | | | | | | | | | | | |
| Sulfur-containing | | | | | | | | | | | | |
| II-1-2 | 0.5 | 1.0 | | | | | | | | | | 0.5 |
| II-2-4 | | | 0.5 | 1.0 | | | | | | | | |
| II-2-5 | | | | | 0.5 | 1.0 | | | | | | |
| AO-5 | | | | | | | | 0.5 | 1.0 | | | |
| Break strength retension (%) | | | | | | | | | | | | |
| 60 hours | 56 | 59 | 54 | 56 | 55 | 57 | 35 | 37 | 35 | 36 | 31 | 32 |
| 120 hours | 38 | 41 | 35 | 39 | 38 | 40 | 19 | 22 | 21 | 22 | 17 | 18 |

| Test compound | Example for comparison | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Phenolic | | | | | | | | | | | | |
| I | | | | | | | | | | | | Non-Addition |
| AO-1 | 0.5 | 0.5 | 0.5 | | | | | | | | | |
| AO-3 | | | | 0.5 | 1.0 | 0.5 | 0.5 | 0.5 | 0.5 | 0.5 | 0.5 | |
| Sulfur-containing | | | | | | | | | | | | |
| II-1-2 | | | | | | 0.5 | 1.0 | | | | | |
| II-2-4 | 0.5 | | | | | | | 0.5 | 1.0 | | | |
| II-2-5 | | 0.5 | | | | | | | | 0.5 | 1.0 | |
| AO-5 | | | 0.5 | | | | | | | | | |
| Break strength retension (%) | | | | | | | | | | | | |
| 60 hours | 32 | 32 | 32 | 34 | 37 | 35 | 37 | 35 | 35 | 36 | 35 | 30 |
| 120 hours | 17 | 18 | 18 | 19 | 22 | 20 | 20 | 19 | 20 | 21 | 19 | 16 |

What is claimed is:

1. A stabilizer for synthetic resins, of which the effective ingredient is a mixture composed of a 1,3,5-tris{2-[3-(3-t-butyl-4-hydroxy-5-methylphenyl)propionyloxy]ethyl}isocyanuric acid (I) and at least one sulfur-containing compound (II) selected from compounds represented by the general formulas (II-1) and (II-2):

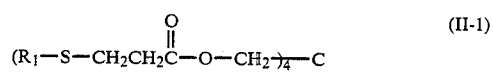

wherein $R_1$ is an alkyl group having 4 to 20 carbon atoms, and

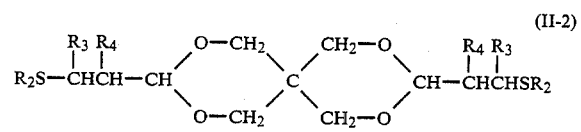

wherein $R_2$ is an alkyl group having 3 to 18 carbon atoms, and $R_3$ and $R_4$ each independently is a hydrogen atom or an alkyl group having 1 to 6 carbon atoms, in the ratio (I):(II) of 1:0.5–15 by weight.

2. The stabilizer for synthetic resins as claimed in claim 1, wherein the sulfur-containing compound (II-1) is tetrakis(3-dodecylthiopropionyloxymethyl)methane.

3. The stabilizer for synthetic resins as claimed in claim 1, wherein the sulfur-containing compound (II2) is 3,9,-bis(2-dodecylthioethyl)-2,4,8,10-tetraoxaspiro[5,5]undecane.

4. The stabilizer for synthetic resins as claimed in any of claim 1 to claim 3, wherein the synthetic resins are polyolefin resins.

5. The stabilizer for synthetic resins as claimed in claim 4, wherein the polyolefin resin is polypropylene.

* * * * *